…

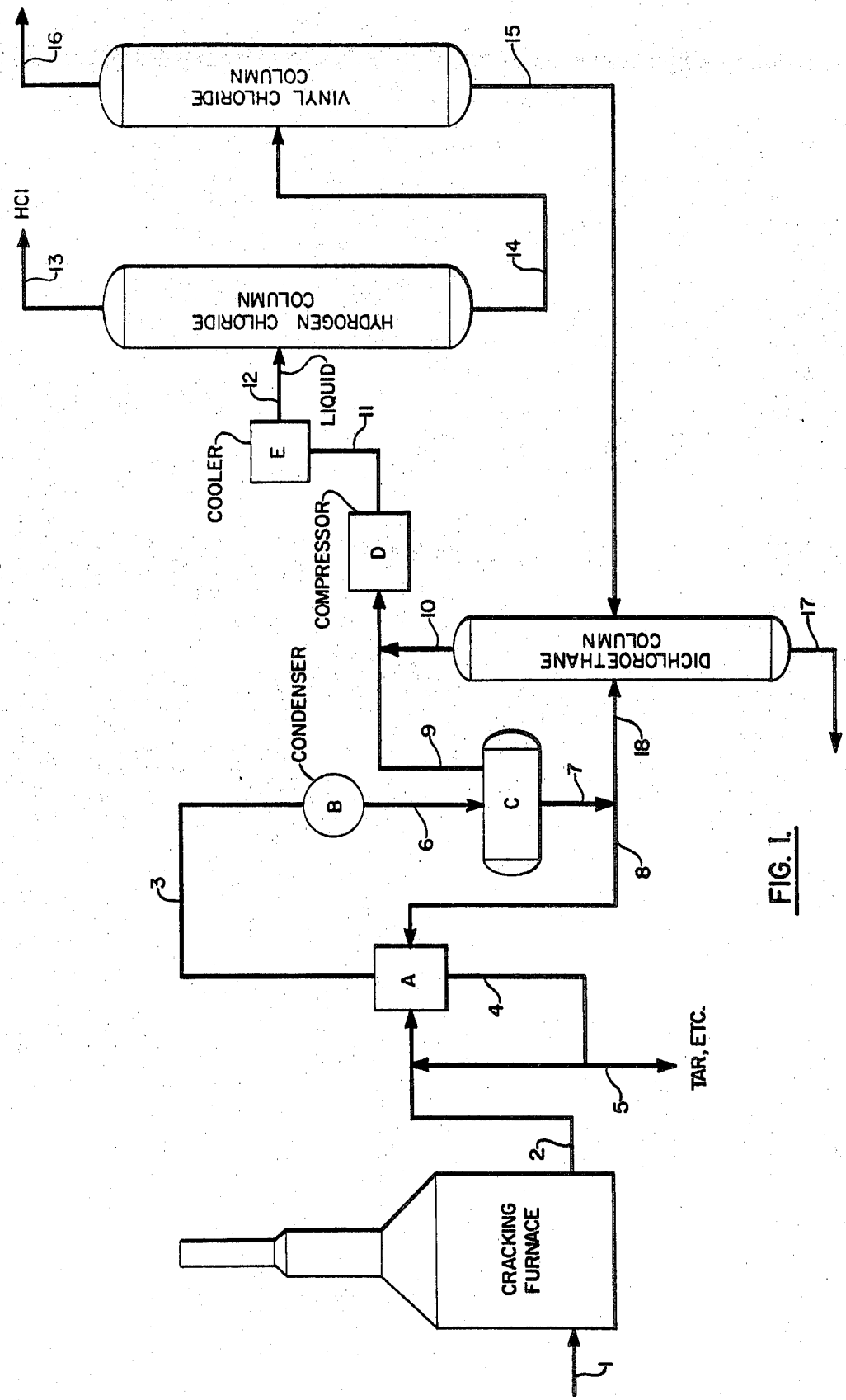

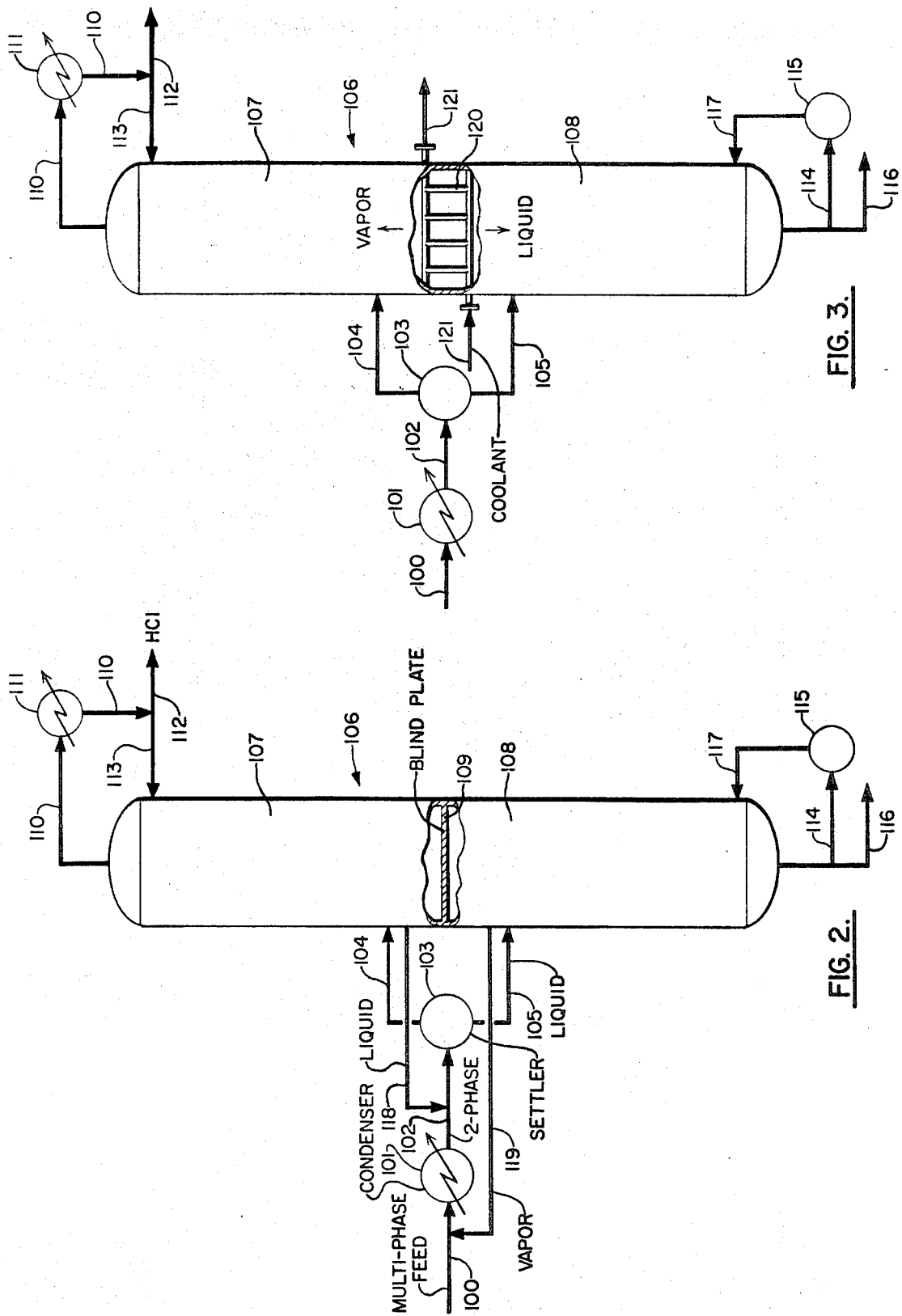

United States Patent Office 3,761,361
Patented Sept. 25, 1973

3,761,361
PRODUCTION AND PURIFICATION OF VINYL CHLORIDE
Henry H. Wall, Jr., Baton Rouge, La., assignor to Ethyl Corporation, Richmond, Va.
Original application Apr. 19, 1967, Ser. No. 632,002, now abandoned. Divided and this application Dec. 7, 1970, Ser. No. 95,971
Int. Cl. B01d 3/00, 3/02, 3/14
U.S. Cl. 202—158      1 Claim

ABSTRACT OF THE DISCLOSURE

This invention relates to a novel process for the production of vinyl chloride by thermal decomposition of dichloroethane and high pressure distillation for purification of the product mixture to recover vinyl chloride. The present invention utilizes two combinations of dual distillation zones which coact to cancel the effects of "sloppy" cut distillations in each zone to achieve substantially pure product streams and a substantially pure recycle stream while still effecting a considerable refrigeration saving.

CROSS-REFERENCES TO RELATED APPLICATIONS

This application is a division of application Ser. No. 632,002 filed Apr. 19, 1967 and subsequently abandoned, and relates to application Ser. No. 362,786 filed Apr. 27, 1964, and now abandoned, and its continuation-in-part application Ser. No. 612,109 filed Jan. 27, 1967, now Pat. No. 3,468,967.

BACKGROUND OF THE INVENTION

It is known that vinyl chloride can be produced by thermally decomposing either 1,2-dichloroethane or 1,1-dichloroethane or both in a cracking furnace at temperatures of about 400° C. and higher. This decomposition involves the splitting of of hydrogen chloride from the dichloroethane molecule, to produce a resulting mixture of reactants and cracking products which present a difficult separation problem. One difficulty encountered in commercial applications of the process is the expense of costly refrigeration systems and refrigerants necessary for the purification of the product stream from the cracking furnace.

It is an object of this invention to provide a process wherein the requirement for refrigeration in the product distillation columns is greatly minimized.

Another object of this invention is to provide a process for the commercial production of vinyl chloride in a more simple and economical manner.

SUMMARY OF THE INVENTION

This invention relates to a process for the production of vinyl chloride comprising in combination the steps of decomposing dichloroethane to produce a mixture containing vinyl chloride, hydrogen chloride and unreacted dichloroethane; distilling at least part of said mixture in a primary distillation zone to produce a gaseous stream containing vinyl chloride, hydrogen chloride and unreacted dichloroethane, and a liquid stream containing substantially pure unreacted dichloroethane; passing said gaseous stream to a primary column of a secondary distillation zone, said primary column being divided into upper and lower zonules by an intermediate blocking means or a zone of cooling coils; further distilling said gaseous stream in said primary column while, withdrawing from the upper zonule a gaseous distillate containing substantially pure hydrogen chloride, and a liquid distillate containing hydrogen chloride, vinyl chloride and unreacted dichloroethane, withdrawing from the lower zonule a gaseous effluent containing hydrogen chloride, vinyl chloride and unreacted dichloroethane, and a liquid effluent containing substantially pure vinyl chloride and unreacted dichloroethane, and passing at least part of said liquid distillate into said lower zonule and at least part of said gaseous effluent into said upper zonule; finally distilling said liquid effluent in a secondary column of said secondary distillation zone to produce a gaseous product stream of substantially pure vinyl chloride, and a liquid mixed stream of vinyl chloride and unreacted dichloroethane; and recycling said liquid mixed stream to said primary distillation zone.

BRIEF DESCRIPTION OF THE DRAWING

For a more complete understanding of the present invention, reference is made to the accompanying drawings.

FIG. 1 is a diagrammatic illustration of a system which may be suitably employed to conduct the process as hereinafter described.

FIGS. 2 and 3 show modifications of the detailed construction of the Hydrogen Chloride Column of FIG. 1.

DESCRIPTION OF THE PREFERRED EMBODIMENTS

As shown in the embodiment of FIG. 1, dichloroethane (either 1,1-dichloroethane or 1,2-dichloroethane) is fed by line 1 into a thermal cracking zone, e.g. a furnace, which may be an unpacked reaction vessel supplied with heating means. The pressure of the gaseous reactants within the zone is maintained at from about atmospheric pressure to less than about 100 pounds per square inch gauge and preferably from about 25 pounds per square inch gauge to about 100 pounds per square inch gauge. The temperature within the zone is generally maintained at from about 800° F. to about 900° F. and preferably from about 825° F. to about 875° F.

The gaseous product stream from the thermal cracking zone is withdrawn via line 2 at a temperature of from about 825° F. to about 875° F. and quenched by a circulating liquid stream 4 from a quenching zone, e.g. knockout drum A, to reduce the temperature of stream 2 to about 250° F. and thereby form a gaseous phase and a liquid phase. Stream 4 is supplied by circulating a part of this liquid phase. A small part of stream 4 comprising carbon and tars may be withdrawn via stream 5 and sent to waste disposal if necessary.

The gaseous phase is withdrawn via line 3 from the quenching zone and passed to a condensation zone, e.g. condenser B. Therein the vapor stream is partially condensed to a liquid portion and a gaseous portion, which coexist as a two-phase mixture. This two-phase mixture is passed from the condenser via line 6 into a disengaging zone or a knockout drum C wherefrom the liquid portion, which is composed principally of dichloroethane, is removed via line 7. Part of the liquid portion is recycled to the quenching zone via line 8 to be reunited with the liquid phase. The remainder of stream 7 is passed via line 18 to a distillation zone, preferably though not necessarily a single column, wherein a pressure of from about 30 pounds per square inch gauge to about 60 pounds per square inch gauge is maintained. This zone is depicted in the drawing as the Dichloroethane Column.

The gaseous portion from drum C is withdrawn via line 9 at a temperature of from about 90° F. to about 110° F. and a pressure of from about 30 pounds per square inch gauge to about 50 pounds per square inch gauge and is compressed together with stream 10, a gaseous stream from the Dichloroethane Column, in a compression zone, e.g. compressor D, to a pressure of less than 300 pounds per square inch gauge and preferably within the range of from about 150 pounds per square inch gauge to about 200 pounds per square inch gauge.

In a typical process run, stream 11 comprises about 55 weight percent hydrogen chloride, about 43 weight percent vinyl chloride and about 2 weight percent dichloroethane. The temperature of the compressed stream ranges from about 315° F. to about 335° F.

The compressed stream 11 is cooled in cooling zone E to a temperature of from about 50° F. to about 150° F., and preferably from about 90° F. to about 110° F., to form a two-phase liquid-gas stream, and this stream is transmitted by line 12 to a further distillation zone, preferably though not necessarily comprising two columns as shown in the drawing. The first column, labelled the Hydrogen Chloride Column (hereinafter more fully described), is maintained at a pressure of from about 150 pounds per square inch gauge to about 200 pounds per square inch gauge. This column contains distillation trays or their equivalent in the form of packing. The overhead from this column, which contains substantially all of the hydrogen chloride as a substantially pure by-product, is withdrawn via line 13 at a temperature of from about −20° F. to about −10° F., and the heavy ends of the column containing primarily vinyl chloride and some unreacted dichloroethane are removed at a temperature of from about 160° F. to about 180° F. and transmitted via line 14 to a second distillation column. This column, labelled the Vinyl Chloride Column, is maintained at a pressure of from about 140 pounds per square inch gauge to about 160 pounds per square inch gauge. From this column the remaining dichloroethane is withdrawn at a temperature of from about 190° F. to about 210° F. in a bottoms stream having a substantial quantity of vinyl chloride therein. The vinyl chloride may range from about 40 weight percent to about 60 weight percent of the bottoms stream. This stream is recycled via line 15 to the first distillation zone which is depicted as the Dichloroethane Column in the drawing.

Substantially pure vinyl chloride is recovered from the top of the second column at a temperature of from about 90° F. to about 110° F. This stream is removed via line 16 and sent to storage. It is possible to achieve substantially pure vinyl chloride and dichloroethane by making offsetting "sloppy" cuts in the Vinyl Chloride and Dichloroethane Columns. Thus, while pure vinyl chloride is removed via line 16, a considerable amount of vinyl chloride is also removed via line 15 along with unreacted dichloroethane. This "sloppy" cut is offset in the Dichloroethane Column which separates the feed streams 15 and 18 into a stream 17 of substantially pure dichloroethane and an impure stream 10 containing a quantity of dichloroethane which is subsequently returned to the Hydrogen Chloride Column and Vinyl Chloride Column. Stream 17 from the Dichloroethane Column is removed at a temperature of from about 270° F. to about 290° F. and after purification may be recycled to the thermal cracking zone.

As explained, the present invention utilizes dual distillation zones which coact to cancel the effects of "sloppy" cuts in each and thus achieve substantially pure product streams and a substantially pure recycle stream while still effecting a considerable refrigeration saving. The term "sloppy" is a word peculiar to the art. By this term it is meant that a distillation column is operated under such conditions that one substantially pure product stream is obtained. Such a product stream may be either the overhead or bottoms of the column, but not both, since the other stream from the column is impure with some quantity of the material comprising the product stream. A "sloppy" cut is the opposite of a "sharp" cut which means that a distillation column is operated under such conditions as to obtain a substantially pure overhead and a substantially pure bottoms. Columns utilizing "sharp" cuts are difficult to control and require considerable refrigeration; additionally there are problems with reboiler fouling. The present invention avoids these difficulties by utilizing "sloppy" cuts. And, through coacting distillation zones, the impure overhead from the first zone is transformed in the second zone into a pure overhead and impure bottoms, and the impure bottoms from the second zone is returned to the first zone to be transformed into a pure bottoms and an impure overhead. Hence, the two "sloppy" cuts cancel out and a pure product overhead and a pure recycle bottoms are achieved.

FIGS. 2 and 3 of the drawing show an additional aspect of the present invention wherein it is found advantageous to use offsetting "sloppy" cuts. That is, the Hydrogen Chloride Column employs offsetting "sloppy" cuts by means of dual zonules within the column. This allows the achievement of a substantially pure overhead stream of hydrogen chloride and a substantially pure bottom stream of vinyl chloride and unreacted dichloroethane. The manner in which this is accomplished will be apparent from the following description of FIGS. 2 and 3.

Multicomponent stream 100, which in the preferred embodiment is vinyl chloride, hydrogen chloride and unreacted dichloroethane, is passed to condenser 101. There stream 100 is transformed into two-phase stream 102 and passed into settling drum 103. From drum 103 there is passed gaseous phase 104 and liquid phase 105 to distillation column 106. As will be noted in the modification of FIG. 2, distillation column 106 is divided into zonules 107 and 108 by an intermediate blocking means 109 which may be a blank, blind or imperforate plate. As is common in distillation, gaseous phase 104 passes up through zonule 107 and is distilled while liquid phase 105 passes down through zonule 108 and is also distilled. A vapor stream is withdrawn from zonule 107 via line 110 and passed through a condenser 111. Pure hydrogen chloride is extracted via line 112 while some hydrogen chloride is admitted back to zonule 107 in liquid form via line 113 as reflux. A similar operation happens in zonule 108; a liquid stream is withdrawn and part of it is passed via line 114 through reboiler 115 to form gaseous stream 117. Substantially pure liquid vinyl chloride and unreacted dichloroethane are extracted via line 116, and stream 117 is readmitted to zonule 108. Meanwhile, liquid distillate is being withdrawn from zonule 107 via line 118 and readmitted to multicomponent feed stream between condenser 101 and drum 103. Also, vapor effluent 119 is being withdrawn from zonule 108 and readmitted to the multicomponent stream ahead of condenser 101. Of course, stream 118 may also be admitted ahead of condenser 101, dependent upon the extent of pressure drop across condenser 101. Thus, it is possible to employ "sloppy" cuts in both zonules 107 and 108 since streams 118 and 119 are both impure and are remixed to be redistilled with multicomponent feed stream 100. On the other hand, streams 112 and 116 are substantially pure. Hence, through use of intermediate blocking means 109 and the remixing of two impure streams from "sloppy" cuts with the feed stream, a pure overhead stream and a pure bottom stream from one column are achieved with minimum operational difficulty.

The modification of FIG. 3 is similar to that shown in FIG. 2 but with the following differences. Instead of using an intermediate blocking mean in the column of FIG. 3, there is employed a zone of cooling coils 120 through which is passed cooling water via lines 121. This allows a liquid distillate from zonule 107 to pass down through cooling zone 120 into zonule 108. On the other hand, gaseous effluent from zonule 108 passes up through cooling zone 120 into zonule 107. Both the aforementioned liquid distillate and gaseous effluent are impure inasmuch as the liquid distillate contains part of the hydrogen chloride extracted via line 112 and the gaseous effluent contains part of the components of the vinyl chloride-dichloroethane stream extracted via line 116. Cooling zone 120 turns column 106 into two zonules whereby the top zonule produces a pure overhead and an impure bottom stream and the lower zonule produces an impure overhead and a pure bottom stream. Thus, the two impure streams are allowed to cancel each other whereby it is possible in one column to achieve both a pure overhead stream and a pure bottom stream by utilizing offsetting "sloppy" cuts in dual zonules. Unlike the modification shown in FIG. 2 it is not necessary to withdraw a liquid stream 118 and a gaseous stream 119 and remix these stream with the multicomponent feed stream.

In order that those skilled in the art can thus appreciate the process of this invention, the following examples are given by way of description and not by way of limitation.

EXAMPLE I 1,2-dichloroethane at 90 p.s.i.g. and 350° F. and chlorine at 90 p.s.i.g. and 120° F. were fed into an unpacked cracking furnace. The temperature within the furnace was maintained at from about 350° F. to about 850° F. A stream was withdrawn from the furnace which contained about 33 mol percent 1,2-dichloroethane, about 33 mol percent vinyl chloride and about 33 mol percent hydrogen chloride and small amounts of other chlorinated compounds such as 1,1,2-trichloroethane. This stream from the furnace was at a temperature of about 850° F. and a pressure of about 60 p.s.i.g. The stream was quenched and fed into a knockout drum. A liquid stream from the knockout drum at 225° F. was recirculated as a quench medium. A vapor stream from the drum at 225° F. and 55 p.s.i.g. was withdrawn and passed to a condenser, partially condensed and cooled to a temperature of 100° F., and then sent to a disengaging drum wherein the stream was separated into a liquid and a gas phase. The liquid phase was composed primarily of 1,2-dichloroethane; 70 weight percent of this liquid was recycled back to the knockout drum. The balance of the liquid was passed to a Dichloroethane Column which was operated at a pressure of about 50 p.s.i.g. The gaseous phase, which was composed primarily of vinyl chloride and hydrogen chloride, was passed at a pressure of about 45 p.s.i.g. and a temperature of about 100° F. along with a vapor stream from the Dichloroethane Column at a temperature of 100° F. into a compressor wherein the pressure was raised to about 200 p.s.i.g. and the temperature was raised to about 335° F. This compressed stream was cooled in a heat exchanger to a temperature of about 100° F. and sent to a Hydrogen Chloride Column. This distillation column was equipped with standard distillation trays and a reflux condenser and was operated at a pressure of 170 p.s.i.g. Substantially pure hydrogen chloride was recovered from the overhead of the column at a temperature of —15° F.; the bottoms, composed of vinyl chloride and 1,2-dichloroethane at a temperature of about 170° F., was fed into a Vinyl Chloride Column equipped with trays and a reflux condenser and operated at a pressure of 150 p.s.i.g. Substantially pure vinyl chloride was recovered as the overhead at a temperature of 100° F. This vinyl chloride product contained essentially no 1,2-dichloroethane. The bottoms from the vinyl chloride column at a temperature of 205° F. and containing about 40 weight percent of vinyl chloride and 60 weight percent of 1,2-dichloroethane was recycled to the Dichloroethane Column.

EXAMPLE II

The process of Example I is repeated substituting 1,1-dichloroethane for 1,2-dichloroethane.

EXAMPLE III

A multicomponent feed stream comprising 60 weight percent vinyl chloride, 32 weight percent hydrogen chloride and 8 weight percent 1,2-dichloroethane was passed to a condenser at 300° F. and 200 p.s.i.g. A two-phase liquid-gas stream from the condenser at 100° F. and 185 p.s.i.g. was then passed to a drum. From the drum, the gaseous phase was passed to an upper zonule and the liquid phase to a lower zonule of a distillation column divided into upper and lower zonules by an intermediate blind plate. The upper zonule was operated at 170 p.s.i.g. and a temperature range of 80° F. to —15° F.; the lower zonule was operated at 200 p.s.i.g. and a temperature range of 120° F. to 170° F. The gaseous phase comprising 53 weight percent vinyl chloride, 47 weight percent hydrogen chloride and 1 weight percent 1,2-dichloroethane, was admitted below the lowest plate in the upper zonule; the liquid phase, comprising 71 weight percent vinyl chloride, 12 weight percent hydrogen chloride and 17 weight percent 1,2-dichloroethane, was admitted above the highest plate in the lower zonule. A liquid stream from below the lowest plate in the upper zonule comprising 85 weight percent vinyl chloride, 14 weight percent hydrogen chloride and 1 weight percent 1,2-dichloroethane was removed and recombined with the multicomponent feed stream between the condenser and drum. A gaseous stream from above the highest plate in the lower zonule comprising 67 weight percent vinyl chloride, 32 weight percent hydrogen chloride and 1 weight percent 1,2-dichloroethane was removed and recombined with the multicomponent feed stream ahead of the condenser. Substantially pure hydrogen chloride was removed as overhead from the upper zonule. A stream comprising 84 weight percent vinyl chloride and 16 weight percent 1,2-dichloroethane was removed as bottoms from the lower zonule.

EXAMPLE IV

The process of Example III is repeated substituting 1,1-dichloroethane for 1,2-dichloroethane.

EXAMPLE V

A multicomponent feed stream comprising 57 weight percent vinyl chloride, 32 weight percent hydrogen chloride and 11 weight percent 1,2-dichloroethane was passed to a condenser at 330° F. and 185 p.s.i.g. A two-phase stream from the condenser at 100° F. and 180 p.s.i.g. was then passed to a drum. From the drum, the gaseous phase was passed to an upper zonule and the liquid phase to a lower zonule of a distillation column divided into upper and lower zonules by an intermediate zone of cooling coils cooled with cooling water. The upper zonule was operated at 175 p.s.i.g. and a temperature range of —15° F. to 80° F.; the lower zonule was operated at 185 p.s.i.g. and a temperature range of 120° F. to 170° F. The gaseous phase, comprising 54 weight percent vinyl chloride, 45.5 weight percent hydrogen chloride and 0.5 weight percent 1,2-dichloroethane, was admitted below the lowest plate in the upper zonule; the liquid phase, comprising 77 weight percent vinyl chloride, 16 weight percent hydrogen chloride and 7 weight percent 1,2-dichloroethane, was admitted above the highest plate in the lower zonule. Substantially pure hydrogen chloride was removed as overhead from the upper zonule. A stream comprising 84 weight percent vinyl chloride and 16 weight percent 1,2-dichloroethane was removed as bottoms from the lower zonule.

EXAMPLE VI

The process of Example V is repeated substituting 1,1-dichloroethane for 1,2-dichloroethane.

It is to be understood that the invention is not limited by the specific examples and embodiments described hereinabove, but includes such changes and modifications as may be apparent to one skilled in the art upon reading the appended claim.

I claim:

1. An apparatus for distilling a multi-component stream containing a gaseous phase and a liquid phase comprising:

(A) a distillation column being divided into an upper zonule and a lower zonule by an intermediate blocking means;

(B) means for passing said multi-component stream to said distillation column, said passing means comprising means for feeding said gaseous phase to said upper zonule and means for feeding said liquid phase to said lower zonule;

(C) means for withdrawing from said upper zonule a gaseous distillate;

(D) means for withdrawing from said lower zonule a liquid effluent;

(E) means for withdrawing from said upper zonule a liquid distillate and introducing said withdrawn liquid distillate into said multi-component stream; and (F) means for withdrawing a gaseous effluent from said lower zonule and introducing said withdrawn gaseous effluent into said multi-component stream.

References Cited

UNITED STATES PATENTS

| | | | |
|---|---|---|---|
| 1,945,367 | 1/1934 | Gobert | 62—29 |
| 2,073,446 | 3/1937 | Ellsberg | 203—74 X |
| 2,411,680 | 11/1946 | Dennis | 62—29 X |
| 2,701,233 | 2/1955 | Quinn | 203—71 |
| 2,769,321 | 11/1956 | Stiles | 62—28 |
| 2,900,312 | 8/1959 | Gilmore | 203—2 X |
| 3,238,735 | 3/1966 | Siewert | 62—28 |
| 3,242,682 | 3/1966 | English | 62—28 |
| 3,390,535 | 7/1968 | Marshall | 62—28 |
| 3,404,175 | 10/1968 | Mercier | 203—81 X |
| 2,455,812 | 12/1948 | Schlesman | 202—158 X |
| 2,609,334 | 9/1952 | Pyle et al. | 203—40 |
| 2,995,499 | 8/1961 | Dukler et al. | 202—158 X |
| 2,767,133 | 10/1956 | Shobe | 203—2 X |

NORMAN YUDKOFF, Primary Examiner

J. SOFER, Assistant Examiner

U.S. Cl. X.R.

202—162; 203—71, 74, 81; 260—656